BEST AVAILABLE COPY

Sept. 18, 1923. Re. 15,687

C. W. FLINT

GUIDE SHOWING COMPARATIVE EXPRESS AND PARCEL POST SHIPPING RATES

Original Filed Jan. 8, 1920 2 Sheets-Sheet 1

THE SHIPPERS GUIDE COMPARATIVE RATES.

ST LOUIS SPECIAL SHEET.

FOR ILLINOIS.

EXPRESS RATES TO SUB BLOCK OFFICES.

THE RATES TO THE FOLLOWING ILLINOIS EXPRESS OFFICES ARE FIGURED ON THE SUB BLOCK BASIS FROM ST LOUIS. ON THIS SHEET THE CORRECT SCALE NUMBER IS SHOWN AFTER EACH OFFICE. ALL TOWNS ON THIS SPECIAL SHEET THAT HAVE POST OFFICES ARE IN THE FIRST OR SECOND ZONE. THESE TOWNS ALSO APPEAR IN ALPHABETICAL ORDER IN THE REGULAR ILLINOIS SECTION.

| | | |
|---|---|---|
| ADDIEVILLE – 5 | BALCOM – 11 | CACHE – 11 |
| ALBERS – 4 | BALDWIN – 5 | CAIRO – 11 |
| ALEXANDER – 8 | BARCLAY – 8 | CAMBRIA – 8 |
| | BARROW – 8 | CAMPBELL HILL – 8 |
| | BARRY – 11 | CANTRALL – 8 |
| | BARTELSO – 5 | CARBONDALE – 11 |
| | BATES – 8 | |

Fig. 3

ILLINOIS 1

| A | B | C |
|---|---|---|
| ABINGDON (d) - J-57 | BADEN BADEN-50 | CABERY-L-13 |
| ACME - K | EX POCAHONTAS 3¾m-T | CABLE - E-66 |
| P.O. PEKIN - 46 | BADER - J-58 | CACHE - W-42 |
| ADAIR - J-58 | BAILEYVILLE - B-43 | CADWELL-Q-26 |
| ADAMS - 75 | BALCOM - W-42 | CAIRO (d) - W-42 |
| EX QUINCY 15m-N | BALDWIN - T-51 | CALEDONIA - C-21 |
| ADDIEVILLE - T-40 | BALLON - 6 | CALHOUN - U-17 |
| ADDISON - H-2 | P.O. RITCHEY-12 | CALVIN - U-18 |
| ADELINE - B-32 | BARCLAY - P | CAMARGO-Q-15 |
| ADEN - 18 | P.O. BUFFALO HART-37 | CAMBRIA - W-14 |
| EX MILL SHOALS 2m-U | BARDOLPH - J-68 | CAMBRIDGE - E-56 |
| ADENMOIR - R | BARNES - 25 | CAMDEN-68 |
| P.O. MARSHALL-7 | EX MERNA - 4m - L | EX AUGUSTA - 14m - J |
| ADRIAN - I-73 | BARNETT-49 | CAMERON - J-67 |
| ADVANCE - 16 | EX ATWATER 4½m-P | CAMPBELL - M |
| EX HIDALGO 6m-Q | BARNHILL - U-18 | P.O. DANVILLE-5 |
| AGNEW - F | BARRINGTON-(d)-C-10 | CAMPBELL HILL-W-52 |
| P.O. GALT - 44 | BARROW-O-59 | CAMP GRANT-B-32 |
| AKIN - 30 | BARRY (d) - N-75 | P.O. NAME GRANT. |
| EX THOMPSONVILLE 6¼m-X | BARSTOW - E-55 | CAMPGROVE - F-45 |
| AKRON - K | BARTELSO - T-39 | CAMP POINT (d) - I-74 |
| P.O. EDELSTEIN - 46 | BARTLETT - G-11 | CAMPUS - G-12 |
| ALBANY - E-55 | (BRANCH PEORIA) | CANAL - 2 |
| ALBERS - T-55 | EX PEORIA - K | (STA. CHICAGO) |
| ALBION (d) - U-18 | BASCO - I-74 | EX CHICAGO - H |
| ALDEN - L-21 | BATAVIA (d) - G-11 | CANTON (d) - J-57 |
| ALEDO (d) - E-66 | BATCHTOWN - 70 | CANTRALL - P-48 |
| ALEXANDER - O-59 | EX WINFIELD MO 7m 5 | CAPRON - C-21 |
| | BATES - P | CARBON CLIFF - E-56 |
| | R.D. LOAMI - 48. | CABONDALE (d) - W-41 |

Fig. 1

Witnesses:

Wm. Schmidthorst

B. G. Richards

Inventor:

Charles William Flint

By Joshua R. H. Cobb.

His Attorney

BEST AVAILABLE COPY

C. W. FLINT

GUIDE SHOWING COMPARATIVE EXPRESS AND PARCEL POST SHIPPING RATES

Original Filed Jan. 8, 1920 2 Sheets-Sheet 2

ILLINOIS FROM ST. LOUIS.

| | FIRST CLASS EXPRESS RATES | | | | | | | | | | | | PARCEL POST RATES | | |
|---|---|---|---|---|---|---|---|---|---|---|---|---|---|---|---|
| | NOTICE ALL ILLINOIS TOWNS MARKED N, O, P, S, T OR W ARE IN SUB BLOCKS FROM ST. LOUIS. SEE ST. LOUIS SPECIAL SHEET OPPOSITE | | | | U | J Q X | I | K L R V | E F G M | Y | B C D H | A | | 1-4 10-13 21-23 32-34 43-45 54-56 64-66 72- | 5-9 14-20 24-31 35-42 46-53 57-63 67-71 73-78 |
| SCALES | 3 | 4 | 5 | 8 | 11 | 13 | 14 | 16 | 18 | 19 | 21 | 23 | | ZONE | ZONE |
| LBS. | | | | | | | | | | | | | LBS. | 3 | 1-2 |
| 1 | 29 | 29 | 29 | 29 | 29 | 29 | 29 | 29 | 29 | 29 | 29 | 29 | 1 | $0.06 | $0.05 |
| 2 | 29 | 29 | 29 | 29 | 30 | 30 | 30 | 30 | 30 | 30 | 31 | 31 | 2 | .08 | .06 |
| 3 | 29 | 29 | 29 | 30 | 30 | 31 | 31 | 31 | 31 | 32 | 32 | 32 | 3 | .10 | .07 |
| 4 | 30 | 30 | 30 | 31 | 31 | 32 | 32 | 32 | 33 | 33 | 33 | 34 | 4 | .12 | .08 |
| 5 | 30 | 30 | 30 | 31 | 32 | 32 | 33 | 33 | 34 | 34 | 34 | 35 | 5 | .14 | .09 |
| 6 | 30 | 31 | 31 | 32 | 33 | 33 | 34 | 34 | 35 | 35 | 36 | 36 | 6 | .16 | .10 |
| 7 | 31 | 31 | 31 | 33 | 34 | 34 | 35 | 35 | 36 | 36 | 37 | 38 | 7 | .18 | .11 |
| 8 | 31 | 32 | 32 | 33 | 34 | 35 | 36 | 36 | 37 | 38 | 38 | 40 | 8 | .20 | .12 |
| 9 | 32 | 32 | 32 | 34 | 35 | 36 | 37 | 37 | 38 | 40 | 41 | 42 | 9 | .22 | .13 |
| 10 | 32 | 32 | 33 | 34 | 36 | 37 | 37 | 38 | 40 | 41 | 42 | 43 | 10 | .24 | .14 |
| 11 | 32 | 33 | 33 | 35 | 37 | 38 | 38 | 41 | 42 | 42 | 43 | 44 | 11 | .26 | .15 |
| 12 | 33 | 33 | 34 | 36 | 38 | 40 | 40 | 42 | 43 | 43 | 45 | 46 | 12 | .28 | .16 |
| 13 | 33 | 34 | 34 | 36 | 38 | 41 | 41 | 43 | 44 | 45 | 46 | 47 | 13 | .30 | .17 |
| 14 | 34 | 34 | 35 | 37 | 40 | 42 | 42 | 44 | 45 | 46 | 47 | 49 | 14 | .32 | .18 |
| 15 | 34 | 35 | 35 | 38 | 41 | 42 | 43 | 45 | 46 | 47 | 48 | 51 | 15 | .34 | .19 |
| 16 | 34 | 35 | 36 | 38 | 42 | 43 | 44 | 46 | 47 | 48 | 51 | 52 | 16 | .36 | .20 |
| 17 | 35 | 36 | 36 | 40 | 43 | 44 | 45 | 47 | 49 | 49 | 52 | 54 | 17 | .38 | .21 |
| 18 | 35 | 36 | 37 | 41 | 43 | 45 | 46 | 48 | 51 | 52 | 53 | 55 | 18 | .40 | .22 |
| 19 | 36 | 37 | 37 | 41 | 44 | 46 | 47 | 49 | 52 | 53 | 55 | 57 | 19 | .42 | .23 |
| 20 | 36 | 37 | 38 | 42 | 45 | 47 | 48 | 51 | 53 | 54 | 56 | 58 | 20 | .44 | .24 |
| 21 | 36 | 37 | 38 | 43 | 46 | 48 | 49 | 52 | 54 | 55 | 57 | 59 | 21 | .46 | .25 |
| 22 | 37 | 38 | 40 | 43 | 47 | 49 | 51 | 53 | 55 | 56 | 59 | 62 | 22 | .48 | .26 |
| 23 | 37 | 38 | 40 | 44 | 47 | 51 | 52 | 54 | 56 | 58 | 60 | 63 | 23 | .50 | .27 |
| 24 | 38 | 40 | 41 | 45 | 48 | 52 | 53 | 55 | 58 | 59 | 62 | 65 | 24 | .52 | .28 |
| 25 | 38 | 40 | 41 | 45 | 49 | 52 | 54 | 56 | 59 | 60 | 63 | 66 | 25 | .54 | .29 |

Fig. 2

Witnesses:
Wm. Schnellbach
E. G. Richards

Inventor:
Charles William Flint
By Joshua R. H. Potts,
His Attorney.

Reissued Sept. 18, 1923.

Re. 15,687

BEST AVAILABLE COPY

UNITED STATES PATENT OFFICE.

CHARLES WILLIAM FLINT, OF CHICAGO, ILLINOIS.

GUIDE SHOWING COMPARATIVE EXPRESS AND PARCEL-POST SHIPPING RATES.

Original No. 1,420,828, dated June 27, 1922, Serial No. 350,089, filed January 8, 1920. Application for reissue filed June 8, 1923. Serial No. 644,272.

*To all whom it may concern:*

Be it known that I, CHARLES WILLIAM FLINT, a citizen of the United States, residing at Chicago, in the county of Cook and State of Illinois, have invented certain new and useful Improvements in Guides Showing Comparative Express and Parcel-Post Shipping Rates, of which the following is a specification.

The invention relates to a reference guide by which a shipper by parcel post or express may determine the respective rates applying and may make instant and direct comparisons of same to determine which of the two services is the cheaper where both are possible under a given condition.

The two principal services available for the transportation of the smaller, lighter and more compact class of commercial shipments are, first, the express service operated in the United States of America by the American Railway Express Company, and other private companies or corporations, and secondly, the parcel post service operated by the United States Government postal department.

Heretofore, comparative rate guides embracing rates for both parcel post and express services have been arranged and published, but such guides have been arranged and compiled so that the method and means of determining the rates by both parcel post and express, when shipping from the town for which the guide was prepared, where an integral and essential part of the list of the express and parcel post offices or towns, so that such guides may be used only for shipments originating from the particular city or point of shipment for which the guide is especially intended to apply and could be used for no other city or initial point of shipment. In consequence, it has therefore been necessary in the past to compile and publish at a very considerable expense a complete new guide for each city that the publisher of shipping information desired to serve, and the compilation, printing and publication of a work of this nature is such a tedious and expensive task that guides have been prepared showing comparative express and parcel post rates for only a few of the largest cities, such as New York city, Chicago, Boston and possibly two or three others. Such cities as Cleveland, Detroit and St. Louis, together with the multitude of smaller commercial centers have not heretofore been served with comparative rate guides for parcel post and express shipments, as it has not been found that the number of possible sales of such special publications would warrent the expense, with the result that shippers from any except the largest centers named, have found it necessary to depend upon information as to rates as furnished in separate publications issued by the express companies or the United States Post Office Department, all of which information, while complete, is not arranged for purposes of ready comparison, necessitating a great amount of work and expense in ascertaining comparative rates, for reasons that will be hereinafter pointed out in comparing the infromation furnished to the public by the postal and express authorities with the information arranged according to my invention.

It is therefore the primary object of my invention to provide an improved form of guide showing both parcel post and express rates that shall contain to a maximum degree information applicable for use in a guide for indicating specific rates from any designated town, city or other point of shipment, thus adapting the same for universal use with a minimum amount of revision or changes.

A further object of the invention is to provide an improved form of parcel post and express rate guide comprising a complete and combined list of the parcel post and express offices of the United States or other nation or country or grand division, such offices being grouped by States or subdivisions and alphabetically arranged throughout on what may be termed primary leaves, together with rate tables for each individual State or sub-division on what may be termed secondary leaves, and designating key numbers or characters of an abbreviated nature to indicate corresponding and comparatively large and un-

AVAILABLE COPY wieldy numbers as established and commonly used in express and parcel post rate information furnished by the U. S. postal department and the express companies, whereby the major portion comprising lists of places of a complete guide showing comparative parcel post and express rates from any given point of shipment may be utilized without revision for publication by changes in said rate tables only, in order to adapt the guide for complete use from any given point of shipment.

It is a further object of the invention to provide in a parcel post and express shippers' guide an improved key or code system adapted to dispense with and make unnecessary the use of the comparatively large series of numbers ordinarily used in designating parcel post units of area and express blocks, particularly when the list of offices or shipping designations for the entire Nation or grand division is divided into groups of such offices by States or other geographical subdivisions larger than said postal units of area or express blocks.

Other objects of the invention will appear from the following description which is directed to an embodiment thereof with reference to certain portions of a guide illustrating fragmentary pages of the essential parts thereof shown in the accompanying drawings in which Fig. 1 illustrates a portion of the shipping destinations or towns of a selected geographical sub-division or State arranged in alphabetical order on what may be termed a primary leaf; Fig. 2 illustrates a portion of the rate sheet applicable to the selected geographical subdivision or State of Fig. 1 on what may be termed a secondary leaf; and Fig. 3 is a fragmentary portion of a special sheet illustrating the manner in which sub-block express offices are treated in order that they may correctly show the express rates that apply to shipping destinations located in the same express block as the town where the shipment originates or in any contiguous block.

The facilities offered by the different transportation agencies carrying parcel post and express shipments, differ widely in some respects but there is sufficient similarity of service and rates applying to the majority of merchandise shipped in packages from one to seventy pounds, the latter being the maximum parcel post package, to make these services directly competitive. Assuming that the services offered by these two systems regarding safety, speed and accuracy are approximately equal, the single feature constantly requiring direct comparison is that of rates. There is a wide variance in the parcel post and express rates, governed by the distance from point of shipment to destination, also by the character of the transportation facilities including density of population adjacent route involved and by the weight of the package being shipped. In some cases it is cheaper to use the express service and in other cases, the parcel post service is cheaper. Because of this situation it is therefore an economical necessity to ascertain the rates by both parcel post and express and by direct comparison determine which service offers the cheaper transportation on any given shipment.

The postal department of the United States Government publishes for distribution at a stipulated fee, a list of all the post offices in the United States, the same being called the "United States Official Postal Guide". This publication, which is in book form, must be used in conjunction with the "Official Zone Key to Parcel Post Guide," the latter being a supplemental and separate sheet of paper on which is shown the zone in which each unit of area is located in relation to some one certain or designated unit of area in which a selected point of shipment is located. In this manner each subscriber or purchaser of the "United States Official Postal Guide" is supplied with the correct zone key applying to shipments originating within the unit of area in which the post office originally receiving his shipment is located. In order to understand the meaning of the term "unit of area" it is necessary to know that under the postal system as established by the act creating the parcel post system, the United States and its several territories and possessions are divided into units of area 30 minutes square identical with a quarter of the area formed by the intersecting parallels of latitude and meridians of longitude, and these are represented on appropriate postal maps or plans originally published by the Post Office Department of the United States Government under the same act. The units of area thus established and numbered as hereinafter described are made the basis of eight postal zones, as follows:

Any unit of area of which any portion lies within 50 miles of the geographical center of the unit of area in which the designated point of shipment is located is considered to be in the "first zone" from such point of shipment; any unit of area more than 50 miles distant but any portion of which is less than 150 miles distant from the geographical center of the unit area in which the initial point of shipment is located in the "second zone;" in a like manner the "third zone" applies to units of area distant from 150 to 300 miles; the "fourth zone" to units of area distant from 300 to 600 miles; the "fifth zone" to units of area distant from 600 to 1000 miles; the "sixth zone" to units of area distant from

BEST AVAILABLE COPY 1000 to 1400 miles; the "seventh zone" to units of area distant from 1400 to 1800 miles; and the "eighth zone" applies to all units of area greater than 1800 miles distant from the center of the unit of area in which the initial point of shipment is located. The eighth zone parcel post rates apply to all possessions of the United States outside the normal boundary lines of the country and to all foreign countries with which the United States has established parcel post relations. Therefore, the zones in which the various units of area are located with reference to any certain or designated unit of area may be worked out and shown on these sheets called "Official Zone Key to the Parcel Post Guide," and it will also follow that each unit of area will require its own zone key especially worked out for it.

For the purpose of forming a definite basis upon which to construct express tariffs, the various express companies, chief of which is American Railway Express Company have divided the United States into geographical squares called blocks and make their rates apply from block to block rather than from point to point or from town to town, from which it follows that all offices or towns in a designated block are subject to the rates defined for the block in which they are located.

An express block is the geographical square formed by the intersection of two lines of latitude and two of longitude. Therefore all express blocks are 60 minutes square and are fixed and unchangeable and are uniform except as to such variations as are due to the necessity that lines of latitude converge from the equator toward the poles. Each of these geographical areas or blocks is given a number. The system of numbering is as follows:

The express blocks lying between parallels 48° and 49°, the latter being the north boundary of the United States, are numbered consecutively from 101 to 139, proceeding from west to east. All blocks lying between parallels 47° and 48° are numbered consecutively from 201 to 258, proceeding from west to east, and this system is continued until the entire area of the United States has been divided into express blocks and each block assigned a definite and fixed number as above described.

The express rates as established and published by the American Railway Express Company in "Local and Joint Tariff of First and Second Class Rates" are divided into 295 graduated divisions called scales. Each scale provides the rate to be charged on packages of all weights from 1 to 100 pounds or more, dependent upon certain conditions relative to length of haul, railroad facilities, character of territory, express divisions or zones traversed, and possibly other considerations. That is, to say, the rates applying on express shipments are designated by scales, worked out on a graduated system so that the charges on a package of any acceptable weight and travelling any distance under any conditions can be quickly determined by the application of the rates as embodied in some one of the various scales. The scales applying from one certain designated block to each and all of the various other blocks, as heretofore described, are worked out and shown in other pamphlets or keys, of which there is one for each block and these pamphlets are called "Local and Joint Block Tariff."

From the above description of the parcel post units of area and express blocks it will be seen that the parcel post units of area are one-fourth of the size of an express block. Each unit of area is given a separate number, the units lying in columns extending north and south being numbered from the north to the south beginning with the column lying farthest east and progressing toward the west. For each of said columns fifty numbers are assigned and on account of the shape of the extreme eastern part of the United States there will be only nine numbers used to designate the units of area appearing in that column. There are not any of the columns throughout the entire United States that makes use of the entire number of the series assigned to each column.

In each of the systems as described for designating express blocks and parcel post units of area the United States is treated as a whole, with the result that the numbers required to designate both the express blocks and parcel post units of area therein run into the thousands, the express blocks running as high as 2545 and the parcel post units of area running to 5813. Since each of the various key sheets or tables for ascertaining the rates applying to the respective express blocks and parcel post units of area must deal with numbers running into the thousands, it is necessary to search through these comparatively cumbersome lists of numbers covering the entire United States in order to find the zone applying to the particular unit of area when parcel post rates are considered and the same condition is true with respect to the numbers designating express blocks when express rate information is desired, since it is obviously necessary to determine the number of a particular block and the scale applying to the same in order to ascertain the correct express rate.

The improved method which I use for simplifying the treatment of these comparatively large and cumbrous numbers applying to the units of area and express blocks is to treat each sub-division of the country

BEST AVAILABLE COPY called a State as an entity and independently of every other State and in connection therewith to consider only such express blocks and parcel post units of area as have any portion thereof lying within the boundary of that particular State.

In preparing a guide embodying the invention of my improved method or system, after the express blocks and parcel post units of area lying wholly or in part within the designated State are determined and listed, I then arrange the parcel post units of area in numerical order, and each of said units of area so arranged are then renumbered or redesignated by arbitrarily assigning a new number or designation, preferably, although not necessarily, a number, to each of the units of area as numbered under the before mentioned system established by the United States postal department. These new arbitrary key numbers, as I prefer to term them, begin preferably although not necessarily, with the numeral 1 for the previously lowest numbered unit of area as established by the United States postal department, and the series proceeds in numerical order until all the units in the State under consideration have been so renumbered. The same system is applied to the officially numbered units of area of all the various States of the Union, and it will be seen that this plan provides much lower designating numbers than those originally adopted under the plan of the United States postal department and results in much simplification and consequent economy of time and expense in both the publishing and in the commercial use of the guide. For example to refer to the system of designating the parcel post units of area in the State of Illinois, it results from the system of the United States postal department that the Illinois units of area run from No. 2114 as a minimum to No. 2519 as a maximum, but it also follows from the system employed that these numbers for Illinois are not consecutive, due to the fact before mentioned that the parcel post units of area are numbered consecutively in the vertical columns from the extreme north limits of the United States to the extreme south limits. It therefore follows that for the State of Illinois the official units of area numbers run from 2114 consecutively to 2122, where a break occurs and the next designations numerically according to the official systems begin with 2164 and extend consecutively to 2174 and with a break to 2214 and extending thence consecutively to 2224 where another break occurs. There will be as many of these consecutive groups of official numbers applied to parcel post units of area obviously, as there are vertical columns of such units of area involved in the official scheme covering the State or any other given State under treatment. For the State of Illinois in connection with which the present exemplification of the invention is described and shown in the drawings, it follows there will be altogether of these official broken numbers, running from 2114 to 2519 more or less consecutively, a total of 78 units of area involved for the entire State. According to my system I number them consecutively beginning with 2114 as number 1, to 78 which applies to the last of the series 2519.

With respect to the treatment of the express blocks my invention contemplates an analogous treatment, and as these blocks run in the State of Illinois in a broken series from 735 as the lowest number numerically to 1237 as the highest number numerically, and as there are altogether 24 of these numbers, I apply to them in numerical order letters of the English alphabet from A to X respectively. While I prefer to use letters of the English alphabet, obviously characters of any other alphabet or other suitable designations may be employed such as numbers. The use of letters or similar characters instead of numbers to designate these express blocks is preferred by me for the reason that the number of express blocks ordinarily in any given State will be approximately one fourth the number of parcel post units of area, there being, for example, in the State of Illinois, as noted, 78 units of area, while there are only 24 express blocks. That the proportion of parcel post units of area to express blocks is not maintained in the exact ratio of four to one for a given State, will, it is apparent, be due to the fact that the irregular boundary lines of the States like the State of Illinois will result in fractional express blocks increasing the proportion of such blocks over the parcel post units of area as apparent in the State of Illinois. While in the State of Illinois there are normally only 24 express blocks to be designated and the normal English alphabet is adequate for the purpose in States like the State of Texas where 77 express blocks are involved it will be apparent that the normal English alphabet will not suffice. I take care of this in such States by combinations of letters. For example, I may take the 26 letters of the English alphabet and by the addition to each of, for example, the first letter A making the series run AA, BA, CA, etc., I may produce a series of designating characters large enough to take care of any contingency.

By making use of the above described key numbers for redesignating officially numbered parcel post units of area and in a like manner making use of the key letters for redesignating officially numbered express blocks as described, I am able to eliminate the cumbrous official designations

BEST AVAILABLE COPY in my comparative rate tables. To illustrate from the drawings in Fig. 1 showing the manner of listing Illinois towns the town of Abingdon is taken. Reference to "American Railway Express Company Official Directory" discloses that Abingdon, Illinois is in express block No. 935, and reference to the "United States Official Postal Guide" discloses the fact that Abingdon is in parcel post unit of area No. 2367. By referring to primary leaf of Fig. 1 in which the express block and parcel post unit of area key letters and key numbers respectively, are worked out, it will be seen that these are designated by "J-57" for Abingdon. These designations are fixed or unvarying for the town of Abingdon or any other town listed in Illinois as shown in Fig. 1 regardless of the center from which rate tables are being constructed or from which rates are being considered. In the exemplification of the invention the rate sheet of Fig. 2 and the St. Louis special sheet of express rates to sub-block offices in Illinois of Fig. 3 are constructed with reference to St. Louis as a center or initial point of shipment. If the official parcel post unit of area and the express block numbers were employed it would be necessary in Fig. 1 to print same opposite the town of Abingdon as for example 935—2367. Then in making up the special rate sheet or secondary leaf of Fig. 2 it would be necessary to print these numbers in the key spaces at the top of the table with the result that instead of the key letters at the top of the express rates arranged in scale columns and the comparatively small key numbers at the top of the parcel post rates arranged in zone columns, we would have the unwieldy or cumbrous numbers of the official publications referred to. This would not only encumber the list of offices or towns of Fig. 1, but would make the rate sheet of Fig. 2 almost impossible of use for ordinary reference purposes. This is especially true when it is considered that in a reference work of this character, it is impossible or impractical to attempt to print lists of towns or shipping destinations and rates on the same sheet, and it follows since reference from one sheet to another must be made, that persons using the guide are forced to refer from the town list sheet to the rate sheet by means of designating characters or numerals, and these obviously must be simplified as much as possible in order to enable the work to be of any practical use.

To further illustrate, it will be seen that the town of Addison, which is in express block 838 and parcel post unit of area 2115, is designated in the list of towns for Illinois by the key letter and number H-2 which like all of the similar key designations of my system are easily remembered or held in the mind of the user until the reference to the rate table may be completed, and from which it will be seen that the express rate to Addison will be found in scale 21 which is the column next to the last of the express rates printed on the Illinois rate sheet of Fig. 2, and on which obviously, are considered only those express scales applying to shipments destined to points in the State of Illinois from St. Louis as a shipping center. If it were desired therefore, to ship one pound by express from St. Louis to Addison it will be seen that the cost by express would be twenty-nine cents. The key number referring to the parcel post rate from St. Louis to Addison being 2 it will be ascertained by reference to the selected list of key numbers at the top of the columns containing the postal rates for zones 1, 2 and 3 that Addison is found in zone 3 from St. Louis and the parcel post rate for one pound therefor is six cents. From this it will be seen that the express rate from St. Louis to Addison is twenty-nine cents for one pound and that the parcel post rate covering the same shipment would be six cents, and the two rates are set forth in parallel column arrangement for comparative purposes.

It will be noted by referring to secondary sheet, Fig. 2 that the key numbers at the top of the parcel post rate columns are grouped wherever possible in consecutive arrangement. The hyphen between two key numbers, for example 1-4, indicates that all towns having parcel post key numbers from 1 to 4 inclusive in the State of Illinois will be found in zone 3 and hence take the rate for zone 3 from St. Louis as a shipping center.

By referring to the Illinois list of towns on primary leaf Fig. 1, it will be seen that Alexander is designated by key letter and number O—59. The express key letter O does not appear with the common key letters designating express scales and rates but above the scale columns 3, 4, 5 and 8 on the Illinois rate sheet. On the Illinois rate sheet we find "All Illinois towns marked N, O, P, S, T or W are in sub-blocks from St. Louis." Reference is further made to "St. Louis special sheet." The latter is the sheet of Fig. 3 and by referring to same we find that Alexander is followed by numeral 8, thus showing that a shipment from St. Louis to Alexander by express is governed as to rates by express scale 8. Referring to that scale on the rate sheet of Fig. 2, it will be seen for example, that the rate on a five pound shipment from St. Louis to Alexander would be thirty-one cents.

It should be borne in mind in considering rates for sub-block offices that such rates apply only to towns located in the same block as the initial point of shipment or in contiguous blocks, from which it follows

BEST AVAILABLE COPY that on account of the geographical location of the city of St. Louis the rate guide compiled for the city of St. Louis would of necessity have these special sub-blocks sheets for only two States namely, Illinois and Missouri, with the single exception of the town of Barlow in the State of Kentucky.

From the above description of my invention it will be seen that the entire United States is divided by the express companies under the supervision of the Government into fixed geographical areas called blocks and upon these blocks and their relation to one another the various express scales and rates or tariffs are fixed. We have also seen that the entire country is divided into certain fixed geographical areas called units of area and that upon these and their relation to one another the parcel post zones and the parcel post rates are based. The improved system for simplifying these rather cumbrous designating numbers for the officially numbered blocks and units has been set forth and I will now state briefly the manner in which the rate tables may be prepared utilizing all these advantages.

In preparing a complete guide covering parcel post and express rates the first step necessary would be to construct complete code tables covering each State and comprising the numbers of all the express blocks and the numbers of all the parcel post units of area lying wholly or in part within each State and then if it is desired to make use of the invention in its most approved form set after each of these numbers designating express blocks and parcel post units of area the new shortened symbols as heretofore described, namely, the shortened numerical designations for parcel post units of area and the alphabetical designations for the express blocks for each State.

It is then necessary to compile State by State lists or primary leaves containing the names of all the express offices and post offices in the United States arranging same alphabetically State by State and affixing thereto the abbreviated symbol for the parcel post unit of area in which each town is located after a post office and the express block symbol after an express office. These lists of offices with their proper designating symbols will then be in such condition as to apply for use as primary leaves in a guide to designate the parcel post and express shipping rates from any point of origin in the United States for which it is desired to construct rate tables on secondary sheets or leaves without alteration or revision of said State lists or primary leaves in any manner. This is an important feature of my invention from which it results that after such lists or primary leaves of shipping points are compiled State by State, it is never thereafter necessary to reconstruct the lists when it is desired to construct a rate guide for any particular shipping point.

We have already seen that there are several hundred express blocks in the United States and 295 scales in the express tariff; that there are also several thousand units of area and 8 parcel post zones, but that comparatively few of them affect any one State. It is therefore possible to construct a separate rate table or secondary leaf for each State which will be comparatively simple as this rate table will show only those zones and scales with their corresponding rates that are effective in such State from the given point of shipment which ordinarily will be the particular commercial center for which it is desired to adapt the guide as for example, important shipping centers like New York, Chicago and St. Louis, although it will be apparent that by my invention a rate guide may be easily and cheaply devised for any shipping point as a center and therein lies the importance of the invention.

I also desire to point out that the invention is not to be construed as limited to the employment of the particular abbreviated code symbols and numerals for designating in a simplified manner the normal express blocks and parcel post units of area, but it will be seen that rate tables or secondary leaves for the various States may be constructed by using instead of the abbreviated express and parcel post symbols the normal or official numbers as employed in the official publications for designating the express blocks and parcel post units of area.

My invention will be seen to so greatly reduce the cost of the preparation and publication of a rate guide for any given city or point of shipping origin that it makes it possible to provide guides for scores of commercial centers in which a demand exists for such a publication but wherein the demand is not sufficient to warrant the compilation and publication of a guide especially designed for one certain city and no portion of which is adaptable for use in any other. Assuming for example, that a guide is made up in the manner illustrated in the accompanying drawings from St. Louis as a shipping center, it will have for the 48 States of the Union one list or primary leaves of the express and post offices for each of the 48 States and these will carry the necessary express and parcel post symbols. It will also consist of the same number of corresponding rate sheets or secondary leaves prepared from St. Louis as a shipping center together with such special sheets as may be necessary to set forth the special rates to sub-block offices from St.

BEST AVAILABLE COPY

Louis. To adapt this guide for use in any other city or point of shipping origin in the entire country as for example, Chicago, it will be unnecessary to make any change whatever in the list or primary leaves of express and post offices as arranged by States or in the symbols or designations printed on those lists. All it will be necessary to change will be the State rate sheets or secondary leaves together with any express sheets showing express rates to sub-block offices from St. Louis. This is an important feature, particularly since it is common in rate guides of this character to publish the same in the form of volumes contained in loose leaf binders and from which it follows that the lists or primary leaves of shipping destinations arranged by States will be uniform throughout guide books arranged for any point of shipping origin in the entire country while in the manner indicated the rate sheets or secondary leaves for the separate States must of necessity be prepared in the manner indicated for each State whenever Chicago as distinguished from St. Louis or whenever any other point of shipping origin is considered in the preparation of the guide.

In order that the invention might be understood the details of the preferred embodiment have been shown and particularly described but it is not desired to be limited to the mere details of the invention for it will be apparent that persons skilled in the art may resort to various modifications without departing from the purpose and spirit of the invention.

I claim:

1. The herein described guide for showing comparative shipping rates or tariffs by parcel post and express comprising a list of shipping destinations arranged in alphabetical order by States or other geographical subdivisions in combination with a rate sheet for the said State or geographical subdivision, said rate sheet comprising tabulated express rates arranged in a plurality of columns designated by scale numbers with each of said columns containing graduated rates for shipments of different weights by express, parcel post rates arranged in tabulated form by zones in columns similar to said express rates and designated by zone numbers, and abbreviated key designations for indicating the numbers of the respective express blocks and parcel post units of area in which the various shipping destinations in the said list are located, said abbreviated key designations being also used to identify the corresponding express scale and parcel post zone columns of rates on the said rate sheet.

2. The herein described guide for showing comparative shipping rates or tariffs by parcel post and express comprising a list of shipping destinations arranged in alphabetical order by States or other geographical subdivisions in combination with a rate sheet for the said State or geographical subdivision, said rate sheet comprising tabulated express rates arranged in a plurality of columns designated by scale numbers with each of said columns containing graduated rates for shipments of different weights by express, parcel post rates arranged in tabulated form by zones in columns similar to said express rates, and designated by zone numbers, and abbreviated key designations for indicating numbers of the respective express blocks and parcel post units of area in which the various shipping destinations in the said list are located, said key designations comprising relatively small numerals as compared with the numbers normally applied to parcel post units of area for indicating the units of area in each State, and simple characters for indicating the numbers normally applied to the respective express blocks, said key letters and key numbers being also used to identify the corresponding express scale columns and parcel post zone columns of rates on said rate sheet.

3. A book made up of primary leaves each containing names of places combined with absolute location characters based upon established parcel post unit of area and express block systems, and secondary leaves each of which contains tables translating said parcel post and express absolute location characters on certain primary leaves into shipping rates from a predetermined center.

4. A book made up of primary leaves each containing names of places combined with absolute location characters based upon established parcel post unit of area and express block systems indicating the positions of said places geographically and secondary leaves each of which contains a table translating certain of said parcel post and express absolute location characters into relative shipping distances from a given shipping center.

5. A book made up of primary leaves each containing names of places combined with absolute location characters based upon established parcel post unit of area and express block systems indicating the positions of said places geographically, secondary leaves each of which contains a table translating certain of said parcel post and express absolute location characters into relative shipping distances from a given shipping center, and each of said secondary leaves also containing a table translating the corresponding aforesaid relative shipping distances into shipping rates.

6. A book made up of primary leaves containing names of places each combined with a character expressing the parcel post unit

BEST AVAILABLE COPY to which it corresponds, and secondary leaves each of which contains a table translating the parcel post units borne by certain of the primary leaves into parcel post zones with reference to a predetermined center, each of said secondary leaves also containing a table translating the parcel post zones shown thereon into shipping rates.

7. A book made up of primary leaves containing names of places combined with characters expressing the parcel post unit of area and express block locations of said places, and secondary leaves each of which contains a table translating said parcel post unit and express block characters into parcel post zones and express scales with reference to a predetermined center, each of said secondary leaves also containing a table translating the parcel post zones and express scales shown thereon into shipping rates.

8. A book made up of primary leaves containing the names of places combined with two distinctive sets of characters or symbols indicating the absolute location characters based upon established parcel post unit of area and express block systems, and secondary leaves each of which contains tables translating said parcel post and express absolute location characters on certain of said primary leaves into shipping rates from a predetermined center.

9. A book made up of primary leaves containing the names of places combined with characters or symbols indicating in an abbreviated manner the established parcel post unit of area and express block number geographical designations of said places, and secondary sheets each of which contains tables translating said parcel post and express characters or symbols on certain primary leaves into shipping rates from a predetermined center.

10. A book comprising leaves each containing names of places combined with both the established parcel post unit of area and express block numbers indicating the positions of said places geographically, adapted to be used in conjunction with tables for translating said unit of area and express block numbers into relative shipping distances from any predetermined shipping center.

11. A book comprising leaves each containing names of places combined with both the established parcel post unit of area and express block numbers indicating the positions of said places geographically, adapted to be used in conjunction with tables for translating said unit of area and express block numbers into relative shipping distances from any predetermined shipping center, and with other tables for translating said relative shipping distances into shipping rates.

12. A book comprising leaves each containing names of places combined with characters or symbols indicating in an abbreviated manner the established parcel post unit of area and express block number geographical designations of said places, said leaves being adapted to be used in conjunction with tables for translating said abbreviated parcel post unit of area and express block number geographical designations into relative shipping distances from any predetermined shipping center and with other tables for translating said relative shipping distances into shipping rates.

13. A book made up of primary leaves each containing names of places combined, with absolute location characters of an abbreviated nature based upon an established express block system in combination with characters for determining parcel post rates, and secondary leaves containing tables translating the express block absolute location characters of an abbreviated nature and the parcel post characters into shipping rates from a predetermined center.

14. A book containing lists of shipping destinations combined with permanent unchanging symbols; and tables translating said symbols into both parcel post and express rates from a predetermined center.

15. A book containing a list of shipping destinations combined with permanent unchanging symbols based upon the geographical locations of said destinations; and tables translating said symbols into both parcel post and express rates from a predetermined center.

16. A book containing a list of shipping destinations combined with permanent unchanging symbols based upon the geographical locations of said destinations with reference to both the express block and parcel post unit of area systems; and tables translating said symbols into both parcel post and express rates from a predetermined center.

17. A book made up of primary leaves containing lists of shipping destinations combined with permanent unchanging symbols based upon the geographical locations of said destinations; and secondary leaves containing tables translating said symbols into both parcel post and express rates from a predetermined center.

18. A book made up of primary leaves containing lists of shipping destinations combined with permanent and unchanging symbols based upon the geographical locations of said destinations with reference to both the express block and parcel post unit of area systems; and secondary leaves containing tables translating said symbols into both parcel post and express rates from a predetermined center.

19. A book made up of primary leaves containing lists of shipping destinations combined with permanent unchanging symbols, and secondary leaves containing tables by means of which said symbols are translated into both parcel post and express rates from a predetermined center.

In testimony whereof I have signed my name to this specification on this 4th day of June, A. D., 1923.

CHARLES WILLIAM FLINT.

Witnesses:
FREDA C. APPLETON,
B. G. RICHARDS.